United States Patent [19]

Fagherazzi et al.

[11] 3,896,216

[45] July 22, 1975

[54] PROCESS FOR THE PREPARATION OF BARIUM TITANATE

[75] Inventors: Giuliano Fagherazzi; Francesco Ferrero; Gianfranco Accattino, all of Novara, Italy

[73] Assignee: Montecatini Edison S.p.A., Milan, Italy

[22] Filed: Nov. 27, 1973

[21] Appl. No.: 419,250

[30] Foreign Application Priority Data
Nov. 30, 1972 Italy.................................. 32283/72

[52] U.S. Cl............. 423/598; 423/594; 252/62.58; 252/62.61; 252/62.62; 252/62.63; 252/62.64; 252/62.56
[51] Int. Cl...................... C01g 23/00; C01f 11/00
[58] Field of Search............................ 423/594, 598

[56] References Cited
UNITED STATES PATENTS

| | | | |
|---|---|---|---|
| 2,974,008 | 3/1961 | Howatt............................... | 423/598 |
| 3,428,416 | 2/1969 | Gie et al............................. | 423/594 |
| 3,549,315 | 12/1970 | Lester et al......................... | 423/594 |
| 3,561,919 | 2/1971 | Ayers................................. | 423/594 X |

*Primary Examiner*—Herbert T. Carter
*Attorney, Agent, or Firm*—Stevens, Davis, Miller & Mosher

[57] ABSTRACT

A process is disclosed for preparing simple, mixed or substituted mild ferrites or barium titanate starting from a slurry containing said constituents and if desired one or more binders and/or dispersing agents, characterized in that, (a) the slurry is dried and granulated by using the hot gases flowing out of stage (b), supplemented if desired by hot gases obtained separately, and which have inlet temperatures of from 400° to 800° C, with the granules having an average size of 150–300 microns; (b) the granules obtained in stage (a) are calcined at temperatures between 700° and 1100° C in the case of ferrites, or between 1150° and 1200° C in the case of barium titanate, in a fluid bed reactor; for 0.5–4 hours, by injecting into the reactor itself a gas or an oxidizing, reducing or inert gaseous mixture, depending on the desired product, and heated either inside or outside the reactor itself; and (c) the product thus obtained is cooled down in a controlled manner and is then ground (preferably in a ball mill by the wet method) to obtain the desired final product.

2 Claims, 1 Drawing Figure

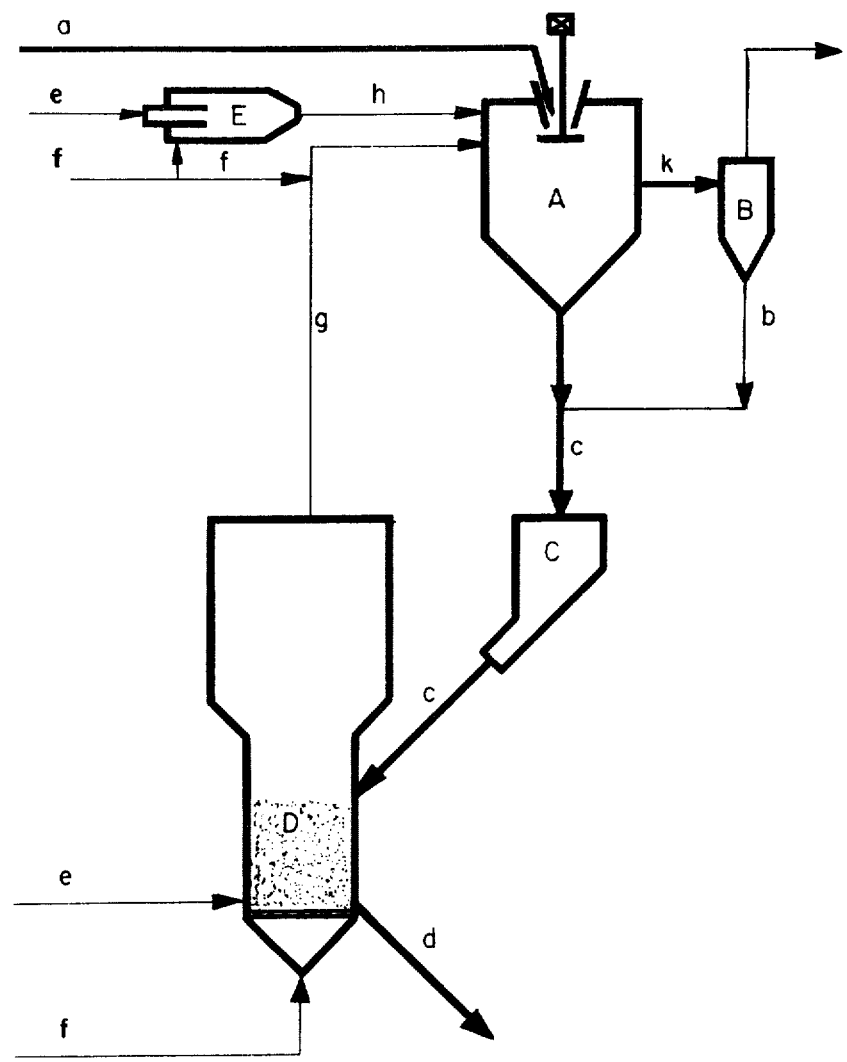

PROCESS FOR THE PREPARATION OF BARIUM TITANATE

The present invention is an improvement over that of the earlier Italian application No. 29049 A/71 (corresponding to Sironi et al. U.S. application Ser. No. 289,054, filed September 14, 1972) relating to a continuous process for preparing barium and strontium ferrites, starting from iron oxide and barium or strontium carbonates.

According to said earlier application, a slurry, consisting of iron oxide and barium or strontium carbonate, water and a binder, was dried and granulated by using the hot gases coming from the successive calcination phase in a fluid bed, combined with hot combustion gases obtained separately. Thereupon the calcination was carried on at a temperature between 950° and 1150° C for from 0.5 to 4 hours, in a fluid bed reactor heated by the combustion within the fluid bed of a non-sulphurized carbonaceous fuel with air.

The ferrite thus obtained was then cooled down and ground for times that were much less than required according to the processes of the still earlier prior art.

The process just described can be conveniently employed for obtaining other ferrites and ceramic products of industrial interest, starting from oxides and/or carbonates such as ferrites having a structure of the spinel type (i.e., having a structure corresponding to that of the $MgAl_2O_4$ mineral) and from barium titanates, either pure or modified with suitable modifying oxides.

The spinel type ferrites have the following general formula:

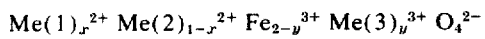

$$Me(1)_x^{2+} Me(2)_{1-x}^{2+} Fe_{2-y}^{3+} Me(3)_y^{3+} O_4^{2-}$$

wherein:

$Me(1)^{2+}$ and $Me(2)^{2+}$ may be $Mn^{2+}$, $Co^{2+}$, $Ni^{2+}$, $Cu^{2+}$, $Zn^{2+}$, $Mg^{2+}$, $Cd^{2+}$ or ($½Li^+ + ½Fe^{3+}$), etc. and $Me(3)^{3+}$ may be $Al^{3+}$, $Cr^{3+}$, $Sc^{3+}$, $Ga^{3+}$, $In^{3+}$, etc.

In the case where $x = y = 0$, simple ferrites will be obtained; In the case where $x \neq 0$ and $y = 0$, mixed ferrites will be obtained; In the case where $x \neq 0$ and $y \neq 0$, substituted ferrites will be obtained.

The ferrites with spinel-type structure will be used (the cobalt one excluded) in the sintered state, as magnets with an hysteresis cycle of small area and of high initial (starting) permeability (mild magnets), for the preparation of transformer cores, cores for inductors, magnetic memories for electronic computers, for phase switches, rotating inductors, filters and other components for microwave equipment, mechanical magnetostriction transducers, cores for aerials, etc.

Barium titanate, $BaTiO_3$, is the basic compound of dielectric ceramics. It belongs to the class of materials having a structure that is isomorphous with perovskite, of the general formula $ABO_3$, wherein A may be Ba, Ca, Sr, Mg or Pb, and B may be Ti, Zr, Sn. It is widely used in ceramic condensers and in other applications.

In the preparation of ferrites with a spinel-type structure (mild ferrite), besides the chemical composition, also of great importance are the calcination temperature, the cooling after calcination, and the thermal treatment, in as much as the magnetic properties of mild ferrite depend chiefly on the distribution of the cations in the two sub-lattices of the spinel structure, in which the sites have respectively a tetrahedron (sites A) and octahedron coordination (sites B). The antiferromagnetic interaction characteristic of these ferromagnetic oxides occurs between the magnetic ions belonging to different sites.

Of great importance also is the granulometry of the mild ferrites, inasmuch as it is well known that the ferrite powders used by industry must be constituted by granules of the size of about one micron.

According to the known methods of preparation of these substances, hematite with a minimum purity of 99%, and containing less than 0.1% of sulphur in the form of submicronic particles, is intimately mixed together, in general by the wet way, with oxides or carbonates of the various bivalent cations that one wishes to introduce into the structure, in the presence, if desired, of binders and/or dispersing substances. Pellets are thereupon formed in a dryer-granulator and these pellets are then baked in rotary kilns or in tunnel furnaces under either atmospheric air or a controlled atmosphere of oxygen (using for instance suitable mixtures of $CO/CO_2$) or else in an inert atmosphere, depending on the ferrites that one wishes to obtain.

The heating or thermal cycle is so chosen as to obtain the desired magnetic properties and yields of product. In general, the reaction temperatures are between 800° and 1100° C.

The cooling may be carried out either in a sudden way (shock cooling) or more slowly in a controlled way, depending on the magnetic properties that one wishes to impart to the product.

The pellets are then ground for a comparatively long time (with a power consumption of more than 50 Kw/hr per ton of product) because of the inevitable sintering of the granules which causes a hardening of the material. This damages the crystalline perfection, the morphology and the granulometry of the particles and thus the magnetic properties of the final product.

Also in the case of the preparation of barium titanates, $BaTiO_3$, one starts from $BaCO_3$ or from BaO and $TiO_2$ in the form of powders of submicronic granulometry. After mixing, if desired in the presence of binders, the product is pelletized in a homogenizing dryer, the same as in the case of ferrites, and is then baked in a rotary kiln at temperatures between 1250° and 1350°C. The subsequent cooling may be carried out either with air or inert gases.

Using this calcination technique, it is quite inevitable that a sintering of the pellets takes place with consequent hardening of the pellets, wherefore it is necessary to grind for a long time in order to obtain a powder with particles of suitable size ($\leq 1\mu$) and to thereby insure good dielectric properties in the sintered product.

According to the present invention, the slurry containing the hematite or the starting ferric oxides or hydroxides and the suitable compound or compounds of $Me(1)^{2+}$, $Me(2)^{2+}$, and $Me(3)^{3+}$ (wherein the symbols have the same meanings already indicated above), or the slurry containing the titanium dioxide and the carbonate or other suitable barium compound, depending on whether one wishes to prepare a simple mild ferrite or a mixed or substituted one, or a barium titanate, are dried and granulated in a dryer-spray granulator or in any other suitable apparatus, employing (as described in the earlier applications cited above) the combustion gases of the fluid bed in which the subsequent calcination takes place, if desired combining those gases with other hot gases obtained separately. In this way, granules are obtained which have an average size of 150–300 microns.

The inlet temperature of the hot gases with which the drying and granulation are thus carried out, is between 400° and 800°C.

The granules are then transferred for calcination to a fluid bed in a fluidized reactor into which an oxidizing gas or gaseous mixture, or a reducing or an inert gas or gaseous mixture is injected, depending on the product that one wishes to obtain.

The heating of the gases may be effected either externally or within the reactor by per se well known means, the temperature within the reactor being maintained between 700° and 1200°C.

The calcination times are between 0.5 and 4 hours.

In case one wishes to obtain mild ferrites, the temperature within the reactor may be maintained (depending on the particular compound to be obtained) between 700° and 1100°C. In the case of barium titanate, the temperature is maintained between 1150° and 1200°C.

By varying the temperature and the residence time of the solids in the fluidized reactor (a temperature in any event lower than those used according to the prior art), it is easily possible to control the size of the granules inside the micropellets, as described in the earlier applications cited above.

With the process which is the object of the present invention, one avoids the sintering of the product obtained, with the very substantial advantage in consequence of reducing the duration and the intensity of the grinding. The product can easily be disintegrated. With grinding times of less than one hour, and with a power consumption of between 1 and 20 Kw/hr per ton of product, it is readily possible to obtain the submicronic powder desired in an economical manner.

In the preparation of mild ferrites and of barium titanate according to the present invention, the same equipment described in the earlier applications cited above may be conveniently employed.

Using the same fluid bed, the cooling of the mild ferrite may be brought about very rapidly, or more slowly at controlled times, by regulating the temperature of the gas or of the gaseous mixture injected with simple per se well known means. In this way it is possible to considerably influence the characteristics of the ferrite, as already explained previously.

The magnetic parameters by which the ferrites are characterized, are as follows:

$\sigma_s$ = magnetic moment of saturation per mass unit; it is the index of the chemical and crystallographic purity.

$_iH_c$ = intrinsic coercive field; that is, the negative magnetic field that brings the magnetization, I, of the sample to zero.

In the C.G.S. system (e.m.), $\sigma_s$ is expressed in electromagnetic units per gram and $_iH_c$ is expressed in Oersted (Oe).

The following detailed working examples are given in order still better to illustrate the invention, in conjunction with the accompanying drawing.

EXAMPLE 1 ($MgFe_2O_4$)

The apparatus is shown schematically as described in the earlier applications cited above (see the accompanying drawing). Reactor D was kept at the predetermined temperature (1050°C) by burning inside the fluidized mass (0.2 cu.m. of ferrite) 4.8 Nm³/hr of methane with 45 Nm³/hr of air + 1 Nm³/hr of oxygen (introduced via lines $e$ and $f$ respectively).

From A, by means of C, there was fed 38.2 kg/hr of a mixture consisting of $Fe_2O_3$ and $MgCO_3$ in a molar ratio of 1:1, and having granules of an average diameter of about 300 microns.

The hematite used had a purity of 99.2% and contained 0.07% of sulfur. From D 31.3 kg per hour of ferrite were discharged which formed the production.

The hot gases flowing out of the reactor via line g were cooled down to 600° C by adding 32 Nm³/hr of air at 25° C admixed with gases at 600° C coming via line h from the outside burner E wherein 4.2 Nm³/hr of methane and 183 Nm³/hr of air were burned. The lines for methane and air are shown at $e$ and $f$ respectively.

The gas at 600° C is fed to the spray drier-pelletizer A where 96 kg/hr of slurry (57.0 kg/hr of $H_2O$ + 25.0 kg/hr of $Fe_2O_3$ + 13.2 kg/hr of $MgCO_3$ + 0.75 kg/hr of polyvinyl alcohol as granulating agent) are introduced via line $a$.

The gases from A at 180° C were freed of powders in cyclone B (introduced thereto via line $k$) and then discharged via line $h$. To the mixture granulated in A was admixed the powder coming from B via line $b$ and this mass was then continuously fed into reactor D through lines $c$ and the feeding device C.

The average residence time of the solids in the reactor amounted to about 4 hours.

From D there were continuously discharged 1.3 kg/hr of magnesium ferrite which was cooled down within 3 hours to room temperature. The product was then ground for 30 minutes in a ball mill, by the wet method, with a power consumption of 5 Kw/hr/ton of product.

The magnesium ferrite thus produced showed the following magnetic properties:

$\sigma_s$ = 20.1 emu/g $_iH_c$ = 40 Oersted

Upon X-ray examination, the product turned out to be completely formed of $MgFe_2O_4$, with some traces of MgO and $\alpha Fe_2O_3$.

Upon a granulometric analysis carried out under an electron microscope, the average size of the particles of the mildly ground product (30 minutes in a ball mill, by the wet method, and with a consumption of 5 Kw/hr/ton of product), proved to amount to about 0.5 $\mu$.

EXAMPLE 2 ($BaTiO_3$)

In this instance, the same apparatus was used. Reactor D was maintained at the predetermined temperature of 1185° C by burning within the fluidized mass 6.2 Nm³/hr of methane and 18 Nm³ per hour of air and 10 Nm³/hr of oxygen (introduced via lines $e$ and $f$ respectively).

From A through C, 41.6 kg/hr of a $BaCO_3/TiO_2$ mixture, in a molar ratio of 1:1 and with the average granular diameter of about 250 microns, were fed into the reactor D. From the reactor D were then discharged 35 kg/hr of $BaTiO_3$ which was the production. The hot gases leaving the reactor D via line g were cooled down to 600° C by adding 15 Nm³/hr of air at 25° C, admixed with gases coming via line $h$ from the outside burner E in which are burned 6.0 nm³/hr of $CH_4$ with 250 Nm³/hr of air, introduced via lines $e$ and $f$ respectively.

The mixed gas enters the spray-dryer-pelletizer A into which 106 kg/hr of slurry (64 kg/hr of water + 29.6 kg/hr of $BaCO_3$ + 12.0 kg/hr of $TiO_2$ + 0.4 kg/hr of polyvinyl alcohol as granulating additive) are introduced via line *a*.

The gases flowing out of A at 180° C via line *k* were freed of powders in cyclone B, and were then discharged. To the granulated mixture in A was then admixed the powder coming from cyclone B via line *b*, and the whole mass was then continuously fed to reactor D through lines *c* and feeding device C.

The average residence time of the solids in the reactor D amounted to 3 hours.

From reactor D 35 kg/hr of $BaTiO_3$ were continuously discharged which was then cooled down within 2 hours to room temperature. The product was then ground for 30 minutes in a ball mill, with a power consumption of 5 Kw/hr per ton of product.

Under X-ray analysis, the product proved to be between 96–98% $BaTiO_3$. There were found traces of other barium titanates, such as for instance $Ba_2Ti_9O_{20}$.

Upon examination under the electron microscope, the average size of the particles obtained by grinding for 30 minutes in a ball mill, by the wet method, proved to be 0.5–1.2 microns.

What is claimed is:

1. A continuous process for preparing barium titanate characterized in that:
   a. a slurry containing titanium dioxide and a barium source selected from the group consisting of barium carbonate and barium oxide is dried and granulated by using the hot gases flowing out of step (b), supplemented by hot gases obtained separately, and which have inlet temperatures of from 400° to 800°C, thus obtaining granules with an average size of 150–300 microns;
   b. the granules obtained in step (a) are calcined at temperatures between 1150° and 1200°C in a fluid bed reactor, for 0.5–4 hours, by injecting into the reactor itself an oxidizing or inert gas heated either inside or outside the reactor itself; and
   c. the product thus obtained is cooled down in a controlled manner and is then ground to obtain the desired final product.

2. A process as defined in claim 1, wherein the grinding step (c) is carried out in a ball mill in the wet way.

* * * * *